United States Patent [19]
Saito et al.

[11] Patent Number: 4,551,716
[45] Date of Patent: Nov. 5, 1985

[54] DISPLAY CONTROL FOR ELECTRONIC CALCULATOR

[75] Inventors: Tomotaka Saito, Yokohama; Kenichi Nagao, Ayase, both of Japan

[73] Assignee: Tokyo Shibaura Denki Kabushiki Kaisha, Kawasaki, Japan

[21] Appl. No.: 390,046

[22] Filed: Jun. 18, 1982

[30] Foreign Application Priority Data

Jun. 30, 1981 [JP] Japan .................................. 56-101587

[51] Int. Cl.⁴ ............................................... G09G 3/00
[52] U.S. Cl. ................................. 340/711; 340/365 S; 340/762; 340/814
[58] Field of Search ..................... 340/365 S, 762, 711, 340/814, 365 E

[56] References Cited

U.S. PATENT DOCUMENTS 3,925,690 12/1975 Spence .................................. 340/762
3,990,070 11/1976 Spence .............................. 340/365 S
4,048,632 9/1977 Spence .................................. 340/762

FOREIGN PATENT DOCUMENTS 51-114023 10/1976 Japan .
53-46646 12/1978 Japan .

Primary Examiner—Marshall M. Curtis
Attorney, Agent, or Firm—Finnegan, Henderson, Farabow, Garrett & Dunner

[57] ABSTRACT

An electronic calculator includes a display section having segment LCDs, a key-in section having a plurality of key switches arranged in a matrix, and a one chip integrated calculation control unit connected to the display section and the key-in section for performing a calculation and a display in accordance with a key input signal. In the calculation control unit of the calculator, a common terminal is used for both a key output signal for detecting the key input signal and a segment signal for driving the display section. The common terminal is so set as to have a high impedance when the key switch is still closed after the end of one time processing of the key input signal.

4 Claims, 24 Drawing Figures

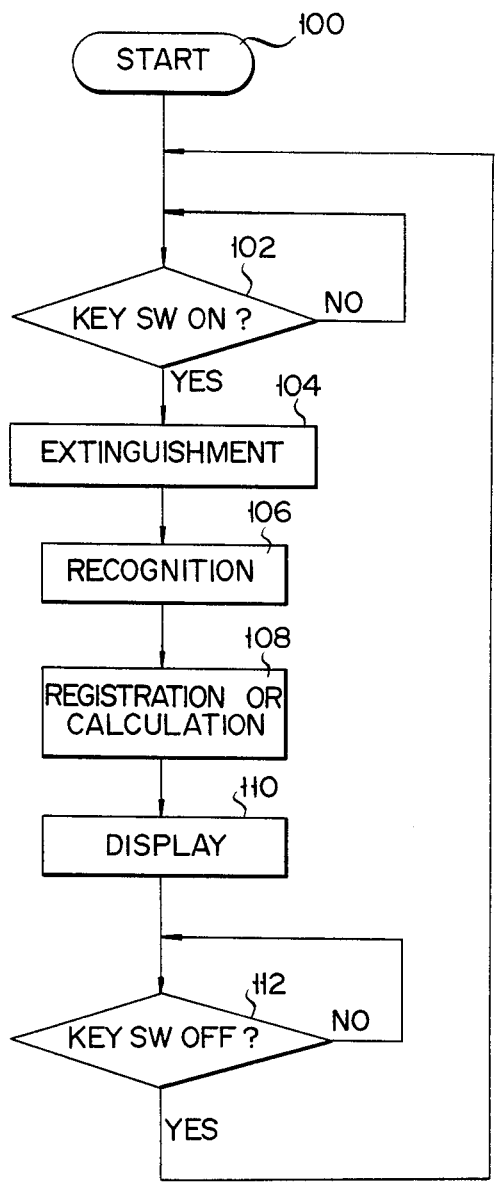

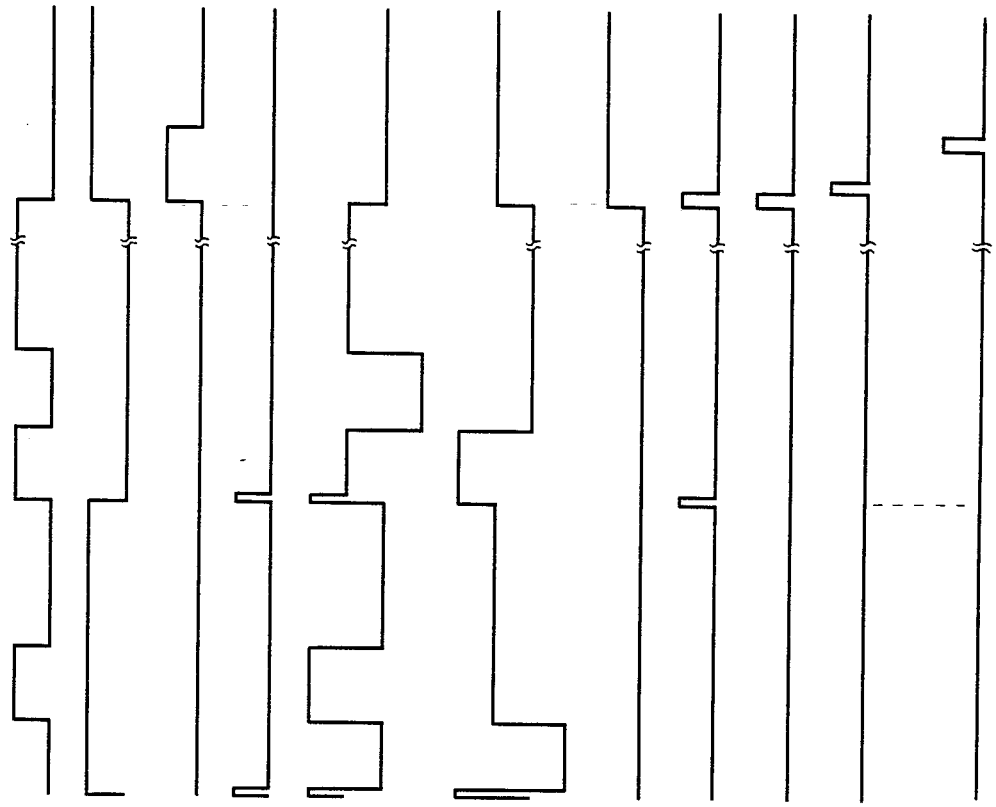

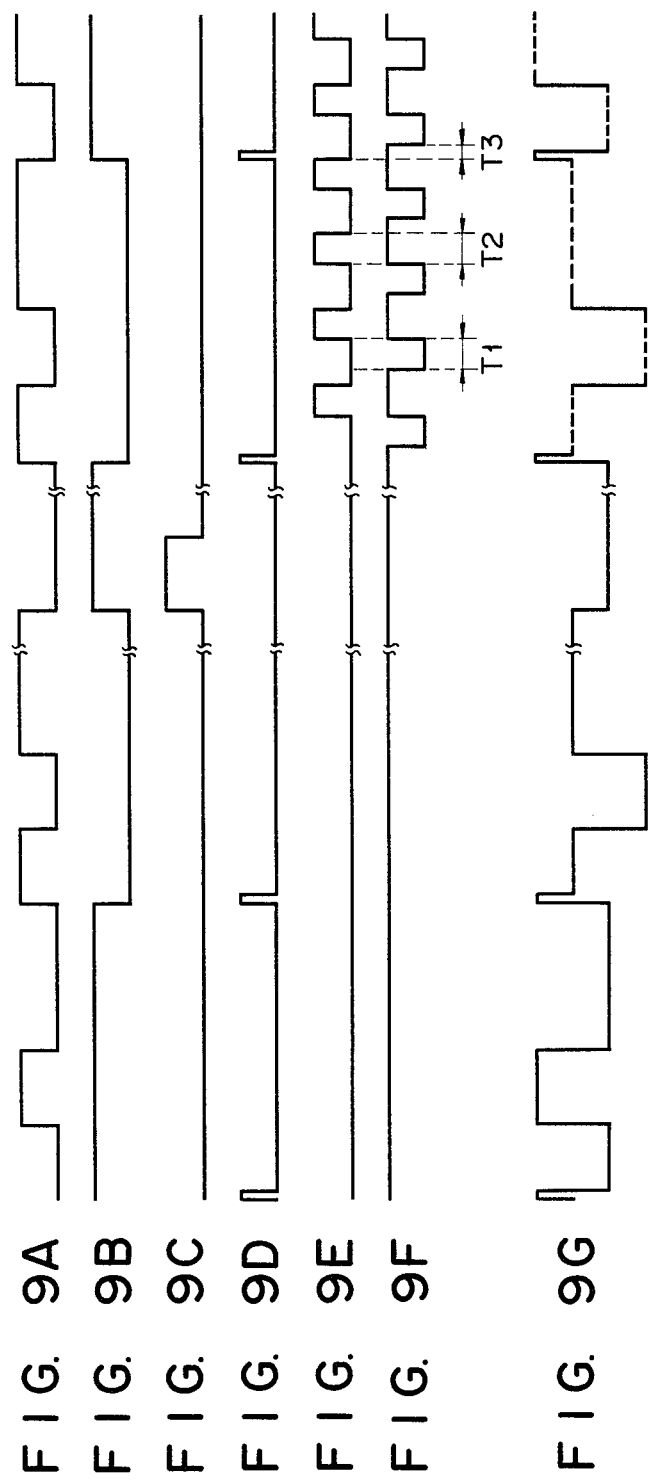

DISPLAY CONTROL FOR ELECTRONIC CALCULATOR

BACKGROUND OF THE INVENTION

The present invention relates to an electronic calculator using a calculation control unit or section integrated into one chip and more particularly to a signal input/output control system for the calculation control unit.

Various types of electronic circuits have been fabricated into integrated circuits, in connection with recent advances in integrated circuit technology. With this tendency, the control section of an electronic calculator is commonly fabricated as a single integrated circuit chip, resulting in highly miniaturized electronic calculators. FIG. 1 shows a circuit arrangement of a prior electronic calculator. The electronic calculator is comprised of a calculation control unit 10 of one chip, a key-in section 12, a display section 14 and a power section (not shown). The key-in section 12 is comprised of 27 key switches arranged in a matrix of 3×9, which are denoted as K-11 to K-19, K-21 to K-29, and K-31 to K-39. A key switch K-ij (j=1 to 9) on each row is connected to the calculation control section 10 through a key-input line KI-i as a row line. A key switch K-ij (i=1 to 3) on each column is connected to the calculation control section 10 through a key-output line KO-j as a column line. The display section 14 employs liquid crystal display elements from a viewpoint of power consumption, and is comprised of 8 digits each including 8 segment LCDs with a decimal point. In the arrangement of the electrodes in the display section 14, 16 segment-electrodes are provided, as shown in FIG. 2A, and 4 backplate-electrodes are provided as shown in FIG. 2B so that the segments can be driven in a time-division manner. The 16 segment-electrodes in the display section 14, respectively, are connected to the calculation control unit 10 by way of the segment lines SG-1, SG-2, ..., SG-16. As the calculation control section 10 should have as few connecting terminals as possible for reducing the manufacturing cost, the nine segment lines SG-1 to SG-9 are connected with the calculation control section 10 through terminals common with those for the nine key-output lines KO-1 to KO-9. The four backplate-electrodes in the display section 14 are connected to the calculation control section 10 through the backplate lines BP-1, BP-2, ..., BP-4.

Description will be given about key signal output circuits 20-1 to 20-9 (serving also as segment signal output circuits) in the calculation control unit 10, which are respectively connected to the key-output lines KO-1 to KO-9, and key signal input circuits 22-1 to 22-3 in the calculation control unit 10 respectively connected to the key-input lines KI-1 to KI-3. Reference is made to FIG. 3. The key signal output circuits 20-i have the same circuit constructions, and the key signal input circuits 22-i also have the same circuit constructions. Accordingly, only the key signal output circuit 20-1 and the key signal input circuit 22-1 are illustrated in FIG. 3, for simplicity of explanation.

An N-channel MOSFET 26 is connected between an output terminal 24 of the key signal output circuit 20-1 and a voltage terminal V1; a P-channel MOSFET 28 is connected between the output terminal 24 and a voltage terminal V2; a P-channel MOSFET 30 is connected between the output terminal 24 and a voltage terminal E. Of those output signals from a decoder, the output signal S1 to be supplied to the segment line SG-1 is supplied to a first input terminal of a NOR gate 32. A key strobe signal D1, which is to be supplied to the key output line KO-1, is supplied to a first input terminal of an AND gate 36 through an inverter 34. On detecting the close of the key switch, a signal Kin to be described later is produced and supplied to second input terminals of the NOR gate 32 and AND gate 36. Output signals of the NOR gate 32 and AND gate 36 are supplied to first input terminals of an AND gate 40 and an OR gate 42 through an OR gate 38. The inverted signal $\bar{P}$ of a key-in detection signal P to be described later for detecting the close of the key switch is supplied to a second input terminal of the AND gate 40, and its output terminal is connected to gates of the N-channel MOSFET 26 and P-channel MOSFET 28. The inverted signal $\overline{Kin}$ of the signal Kin is supplied to a second input terminal of the OR gate 42. An output signal of the OR gate 42 and the inverted key-in detection signal $\bar{P}$ are supplied to an AND gate 44 and its output signal is supplied to a gate of the P-channel MOSFET 30. As will be described later, a B signal produced during a period other than that to judge the close of the key switch is supplied to a gate of an N-channel MOSFET 46 and to a gate of an N-channel MOSFET 48 through an inverter 50. The MOSFETs 48 and 46 are connected in series between the voltage terminal V1 and the ground terminal and their connecting point is connected to a backgate of the N-channel MOSFET 26. Sources of the MOSFETs 46 and 48 are connected to backgates thereof.

An input terminal 52 of the key signal input circuit 22-1 is connected to a set terminal S of a flip-flop 54 and to a drain of an N-channel MOSFET 56. An OR signal Kin+P of the signal Kin and the key-in detection signal P is supplied to a gate of the MOSFET 56 of which the source is connected to the ground terminal and its backgate. Signals KR and $\phi$ are a reset signal and a clock signal, respectively. Q output signal of the flip-flop 54 is supplied to a key-input processing circuit (not shown) in the calculation control unit 10. This key-input processing circuit generates the key-in detection signal P, a key strobe signal Dj (j=1 to 9), the Kin signal, and the B signal.

FIG. 4 illustrates a circuit used for the key signal output circuit 20 and for producing levels V1 and V2 of the segment signal to drive the display section 14. This circuit is a voltage-dividing circuit of the $\frac{1}{4}$ duty and $\frac{1}{3}$ pre-bias type which is usually employed for driving the LCD. This circuit is comprised of resistors 60, 62, 64 and 66 having the same resistances and connected in this order in series between the power terminal E and the ground terminal, and a P-channel MOSFET 68 and an N-channel MOSFET 70 connected in parallel with the resistors 60 and 66, respectively.

The connection point between the resistors 64 and 66, the connection point between the resistors 60 and 62, and the connection point between the resistors 62 and 64 serve as voltage terminals V1, V2 and V3, respectively. The backgate of the N-channel MOSFET 70 is grounded. The inverted signal $\overline{W+Kin+P}$ of the OR signal of a switch signal W for driving the LCD in an AC mode, the signal Kin, and the key-in detection signal P is applied to gates of the MOSFETs 68 and 70. With this connection, when the signal $\overline{W+Kin+P}$ is logic 1, the N-channel MOSFET 70 is conductive and $V2=\frac{2}{3}E$, $V3=E/3$ and $V1=0$. When the signal $\overline{W+Kin+P}$ is logic 0, MOSFET 68 is conductive and $V2=E$, $V3=\frac{2}{3}E$ and $V1=E/3$. The voltage V3 is used for determining the level of the backplate signal of the LCD.

Segment signal output circuits in the calculation control unit 10 connected to the respective segment lines SG-10 to SG-16 are simple circuits for merely producing output signals of the decoder, and are not essential to the present invention. Backplate signal output circuits connected to the respective backplate lines BP-1 to BP-4 are to merely produce signals corresponding to the output signals from the decoder, and therefore no further explanation will be given.

In operation, FIG. 5 shows a flow chart illustrating the operation of the prior electronic calculator as mentioned above. In a step 102 succeeding start step 100, it is judged whether a key switch is closed or not. At this time, the result in the preceding registration or calculation is displayed in the display section 14. Immediately after power on, the display section 14 displays "0". The step 102 continues to loop back through the NO branch until the close of a key switch is detected. Upon detection of close of a key switch, the display in the display section is extinguished in step 104. In step 106, the judgment as to what key switch is closed, that is, the recognition of the actuated key, is made. On the basis of the recognition, the registration or calculation is performed in step 108. In a step 110, the result of the registration or calculation is displayed again. In a step 112, it is judged whether the key switch is still closed or not. This determination is necessary because data must be input only once while the key switch is closed, however long or short the key switch is kept closed. If the key switch is still closed after all the processings of the input data, the control unit 14 must not execute the next processing until the key switch is opened. The step 112 continues to loop back through the NO branch until the opening of the key switch is detected. When opening of the key switch is detected, the step 102 is again executed to process the next keyed-in data.

The operation of the circuit shown in FIG. 3 will be described referring to time charts shown in FIGS. 6A to 6I. The key-in recognition system employs a time-division multiplexed key strobe system capable of recognizing a plurality of key switches through a single signal line. Output signal S1 from the decoder and a switch signal W for AC-driving the LCD are illustrated in FIGS. 6A and 6B, respectively. As shown in FIG. 6C, the signal Kin is normally logic 0. The inverted signal $\overline{S1}$ of the output signal from the decoder produced at NOR 32 is supplied to the AND gates 40 and 44. The key-in detection signal P is a pulse signal in synchronism with a change of the switch signal W, as shown in FIG. 6D. When the key-in detection signal P is logic 1, the AND gates 40 and 44 are nonconductive, then the P-channel MOSFETs 28 and 30 are conductive. At this time, $\overline{W+Kin+P}$ is logic 0, so that the P-channel MOSFET 68 is conductive (FIG. 4). Since E(V) has been applied to the terminal V2, a key-in detection pulse of E(V) is produced from the output terminal 24 of the key signal output circuit 20-1, as shown in FIG. 6E. The pulse is applied to the segment electrodes of the display section 14 through the segment signal line SG-1 and to the key switches K-11, K-21 and K-31 in the first column in the key-in section 12, through the key-output line KO-1. When the key-in detection signal P is logic 0, the segment signal S1 is produced from the output terminal 24. The display in the display section 14 is in accordance with the segment signal S1. The pulse width of the key-in detection pulse P is set to a short time, so as not to provide an adverse effect on the display in the display section 14. The backplate signal BP-1 of the calculation control unit 10 is illustrated in FIG. 6F. The backplate signal BP-1 also contains the key-in detection pulse. The signal B is usually logic 0, as shown in FIG. 6G. For this reason, the N-channel MOSFET 46 is usually nonconductive, while the N-channel MOSFET 48 is usually conductive, and the V1 voltage terminal is connected to the backgate of the N-channel MOSFET 26. Accordingly, the ON-resistance of the N-channel MOSFET 26 is small. This feature is convenient for driving the LCD. The key signal output circuit connected to the other key-output lines KO-2, KO-3, . . . , KO-9 likewise produces the segment signal and the key-in detection signal.

The signal level at the input terminal 52 of the key signal input circuit 22-1 is illustrated in FIG. 6H. The signal level at the input terminal 52 is determined by the open or closed state of the key switches K-11, K-12, . . . , K-19 connected to the key-input line KI-1. When the key switches K-11 to K-19 are all opened, it is logic 0. When any one of the key switches is closed, key-in detection pulse P is supplied to the input terminal 52, through key signal output circuit 20-1, key-output line KO-1, the key switch, key-input line KI-1 and key signal input circuit 22-1. The N-channel MOSFET 56 is conductive in response to the key-in detection pulse P. When the key switch is closed, the level at the input terminal 52 is logic 1 in accordance with the key-in detection pulse P. The flip-flop 54 is set by the clock signal $\phi$ when the set terminal S is logic 1 to produce a Q output signal. The Q output signal is supplied to a key-in processing circuit (not shown). The flip-flop 54 is then reset. The key-in processing circuit detects the Q output signal several times and then the close of the key switch is detected. The process up to this point corresponds to the judgment step 102 for judging the close of the key switch.

When the close of the key switch is detected, the level difference between the segment signal and backplate signal is below the threshold level of the LCD, and the display section 14 is extinguished. Simultaneously, the signal Kin and the signal B are logic 1, as shown in FIGS. 6C and 6G, respectively. As a result, the NOR gate 32 in the key signal output circuit 20-1 is nonconductive while the AND gate 36 is conductive. The inverted signal $\overline{D1}$ of the key strobe signal D1 is supplied to the AND gates 40 and 44. The key-in detection signal P is prohibited from being produced when the signal Kin is logic 1. Accordingly, the signal $\overline{D1}$ passes through the AND gates 40 and 44. The key strobe signals are pulse signals produced after the signal Kin becomes logic 1, and the key strobe pulse signals D1 to D9 produced for the key signal output circuits 20-1 to 20-9 are different from one another in their timings, as shown in FIG. 6I. When the signal Kin is logic 1, the signal $\overline{W+Kin+P}$ (FIG. 4) is logic 0 and voltages of E/3 and E(V) are respectively applied to the voltage terminals V1 and V2. When the signal $\overline{D1}$ is logic 1, the key output terminal 24 is at E/3(V), while when the signal $\overline{D1}$ is logic 0, it is at E(V). Therefore, so long as the signal Kin is logic 1, the key strobe signals D1 to D9 are produced onto the key-output lines KO-1 to KO-9, respectively. The key strobe signals D1 to D9 are also applied to the key signal input circuit through the key-output line, the key closed and the key-input line KI-1. It is assumed that only the key switch K-11 is closed, of those key switches K-11 to K-19 connected to the key-input line KI-1. At this time, the key strobe signal D1 appears at the input terminal 52, as shown in FIG. 6H. Since the signal Kin is logic 1, the N-channel MOSFET 56 is conductive. When the key strobe signal D1 is logic 0 of E/3(V), the level at the input terminal 52 is determined by a ratio of the ON-resistances of the N-channel MOSFETs 26 and 56, and takes midvalue between E/3 and 0(V). For this reason, the flip-flop 54 is not set. When the key strobe signal D1 is logic 1 of E(V), the level at the input terminal 52 is determined depending on a ratio of the ON-resistance of the parallel P-channel MOSFETs 28 and 30 taken with the ON-resistance of the series N-channel MOSFET 56. Since the ON-resistance of the P-channel MOSFET 30 is much smaller than that of the N-channel MOSFET 56, the level at the input terminal 52 is kept substantially at E(V). Accordingly, the flip-flop 54 is set. That is to say, the key strobe signal D1 is applied to the key-in processing circuit. The key-in processing circuit identifies the key switch closed at the timing of the key strobe signal. The period up to this point corresponds to the recognizing step 106.

In the recognizing step 106, the signal B is logic 1, so that the backgate voltage of the N-channel MOSFET 26 is at 0(V). When V1=E/3(V), the N-channel MOSFET 26 is biased with the backgate voltage of E/3(V). Accordingly, the threshold voltage of the MOSFET 26 is large and its ON-resistance is increased.

Then, the registration or calculation corresponding to the key switch identified is performed, also at this time the display is extinguished. After the registration or calculation, the result of this operation is displayed. On the basis of the key-in detection signal P, the close of the key switch is judged again. When it is detected that the key switch is not closed, the signal B is rendered logic 0 and a state of the step 102 is set up. When the key switch is closed, the signal B is kept at logic 1.

As described, to reduce the number of the connecting terminals to a minimum, the terminals for display and the terminals for key-in recognition are commonly used, and the recognition of the key-in is performed by using the key strobe system. However, this approach has the following disadvantages. Of those key switches connected to the same key-input line, a plurality of key switches are simultaneously closed, that is, in a multi-close of the key switches, the problem arises. For example, when four key switches K-11, K-12, K-13 and K-19 connected to the key-input line KI-1 are simultaneously closed, a circuit as shown in FIG. 7 is formed. In this circuit, it is assumed that the N-channel MOSFETs 26-1 to 26-3, and the P-channel MOSFET 28-9 are conductive, signals at V1, V1, V1 and V2 level are derived from the key output terminals 24-1 to 24-3 and 24-9, respectively. Where the key switches K-11, K-12, K-13 and K-19 are closed, there is a current path including MOSFET 28-9 in series with parallel-connected N-channel MOSFETs 26-1, 26-2, 26-3 between the voltage terminals V1 and V2 in addition to the current path including the series resistors 62 and 64. If it is assumed that the resistance of the resistors 62 and 64 is R, the ON-resistances of the N-channel MOSFET 26 and the P-channel MOSFET 28 are Rn and Rp, respectively, the resistance Rt between the V1 and V2 voltage terminals is given by $$Rt = 2R\left(Rp + \frac{Rn}{3}\right) / \left(2R + Rp + \frac{Rn}{3}\right)$$

From the above equation, it is seen that in order to normally produce the voltage E/3 and ⅔E from the V1 and V2 voltage terminals, it is necessary merely to satisfy 2R≃Rt, and to this end, 2R<<Rp+Rn/3 must be satisfied. In a situation where key switches of M+N are simultaneously closed, and the N-channel MOSFETs 26 of M and the P-channel MOSFETs 28 of N are conductive, to set the V1 and V2 voltage terminals at a normal level, the following relation must be satisfied $$2R << \frac{Rp}{M} + \frac{Rn}{N}$$

If the relation is not satisfied, in a situation requiring V1=E/3(V), the voltage V1 is set at a level determined by a ratio of R and Rp/M=Rn/N. This is true for a situation requiring V2=⅔E(V).

When the levels of the voltages V1 and V2 obtained are improper, erroneous display or imperfect display takes place in the display section 14. To solve this problem, all one has to do is to lessen the resistance of the resistors 60, 62, 64 and 66. This approach, however, brings about increase of current consumption. Accordingly, the ON-resistance Rn and Rp of the N-channel MOSFET 26 and of the P-channel MOSFET 28 must be set at a much larger value than the resistance R. The drive ability of the MOSFETs 26 and 28 are set at a minimum value necessary to drive the LCD segment. From this standpoint of the display drive, it is preferable that the ON-resistance of the MOSFETs 26 and 28 be as small as possible.

As described above, the prior art has a contradiction that the ON-resistance of the MOSFETs 26 and 28 should be set at a small value for driving the display segments in a normal display step 102 (FIG. 5) when the key switch is not closed and at a much larger value than the resistance R in the display steps 110 and 112 (FIG. 5) when the key switch is closed. To realize this, the ON-resistance of the MOSFETs 26 and 28 must be set at a minimum value necessary for driving the display segments, and during the display where the key switch is closed, a backgate bias of V1 is applied to the N-channel MOSFET 26. With this arrangement, the threshold voltage of the N-channel MOSFET 26 rises to increase its ON-resistance. In the case where multiple key switches are closed, there is a possibility that the above-mentioned problems arise during the period from the judging step 102 to the extinguishment step 104 in FIG. 5. However, this period is very short and the problem arising from this is negligible in practical use.

The drive ability of the N-channel MOSFET 26 is set at the minimum. For this reason, when the backgate bias is applied to the MOSFET 26, the ON-resistance of the MOSFET 26 frequently grows excessively. This fact leads to a situation that when the manufacturing parameters vary in manufacturing the LSI as the calculation control unit 10, the display segments are not driven. The probability of the occurrence of such situation is greater, as the threshold voltage of the N-channel MOSFET 26 is larger. Therefore, when the common terminal for the display signal and key signal is used, the requirements for the threshold voltage and the manufacturing parameters of the LSI are strict. Therefore, some measure must be taken to satisfy the strict requirements. For example, a tolerance of the threshold voltage is set at a narrower value than the usual one, or it is shifted toward the 0(V) position. This leads to a reduction in production yield and an increase in manufacturing cost.

SUMMARY OF THE INVENTION

Accordingly, an object of the present invention is to provide an electronic calculator which needs a lesser number of terminals and therefore is not subject to reduced production yields and increased manufacturing costs, with a technical idea that, of the terminals of a single chip calculation control unit, the terminals for the key signal and the display signal are designed to be common for both the signals.

The above-mentioned object of the present invention is realized by an electronic calculator comprising a display section including segment type capacitive display elements for a plurality of digits, a key-in section including a plurality of key switches arranged in a matrix fashion, and a single chip integrated calculation control unit connected to the display section and to the key-in section which supplies a detection signal to the key-in section, and receives the detection signal applied through the key-in section to supply a segment signal to the display section according to the detection signal, whereby the detection signal and the segment signal are produced from a common terminal which is placed in a high impedance state during the period that the display section is operating.

BRIEF DESCRIPTION OF THE DRAWINGS

FIG. 5 shows a flow chart illustrating the operation of the prior electronic calculator;

FIGS. 6A to 6I show timing charts useful in explaining the operation of the same;

FIGS. 9A to 9G are timing charts helpful in explaining the operation of the embodiment shown in FIG. 8.

DETAILED DESCRIPTION OF THE PREFERRED EMBODIMENT

Figure 3:
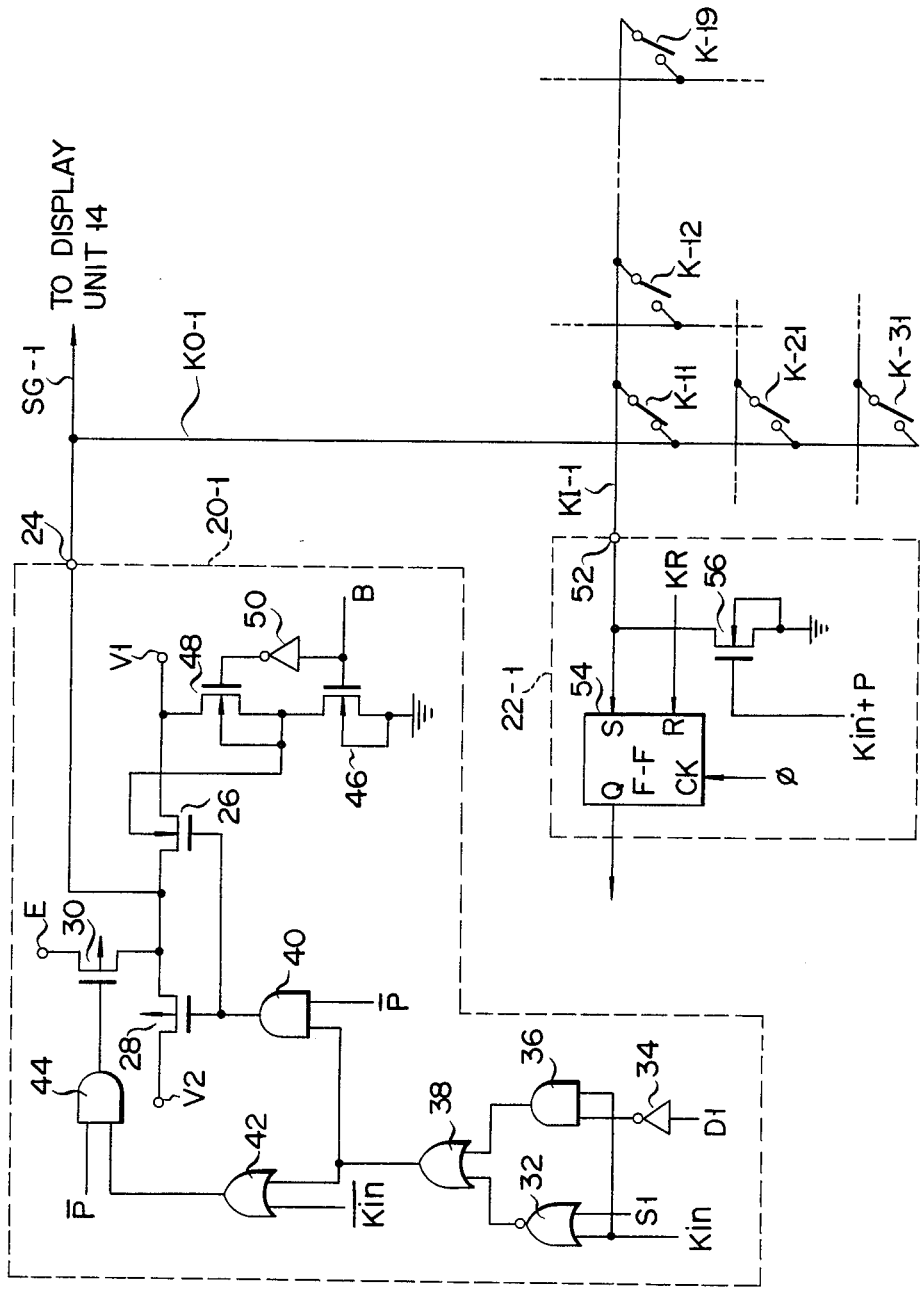
FIG. 3 is a circuit diagram of key signal input/output circuit for detecting a key-in used in a calculation control section of the calculator.
Figure 8:
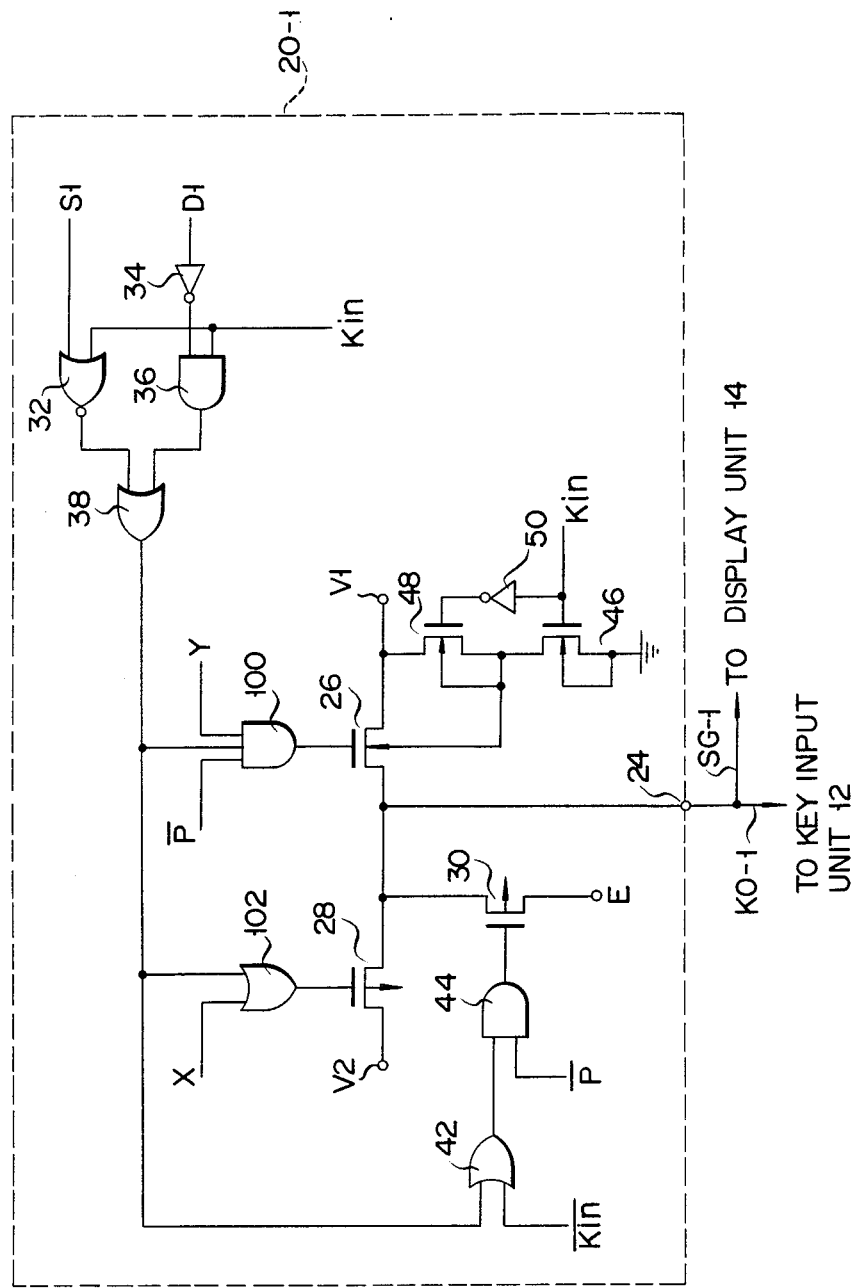
FIG. 8 is a circuit diagram illustrating an embodiment of an electronic calculator according to the present invention.

An embodiment of an electronic calculator according to the present invention will be described referring to the accompanying drawings. FIG. 8 shows a circuit diagram of one key signal output circuit 20-1 of those used in the present embodiment, which corresponds to that in the circuit of FIG. 3 of the prior art as already described. In the figure, same reference numerals similar to those used in FIG. 3 identifying functionally similar elements to avoid duplication of description. The remainder of the key output circuit, the key signal input circuit, and the like are the same as those of the prior art. Accordingly, no further explanation of those will be described. In the present embodiment, output signals from an AND gate 100 and an OR gate 102 are respectively applied to gates of N-channel MOSFET 26 and P-channel MOSFET 28. An output signal from OR gate 38 is applied to an OR gate 42 and also to first input terminals of the AND gate 100 and OR gate 102. A signal X to be described later is applied to a second input terminal of the OR gate 102. The inverted signal $\overline{P}$ of the key-in detection signal and a signal Y to be described later are respectively applied to second and third input terminals of the AND gate 100. The signal Kin, instead of the signal B, is applied to the gate of N-channel MOSFET 46 and the input terminal of inverter 50.

The operation of the present embodiment will be described referring to the time chart shown in FIGS. 9A to 9G. The output signal S1 of the decoder, the display switch signal W, the signal Kin, and the key-in detection signal P are the same as those in the prior art and shown in FIGS. 9A to 9D, respectively. The signals X and Y are logic 0 and logic 1 in the step for detecting the close of the key switch, as shown in FIGS. 9E and 9F, respectively. Therefore, the inverted signal $\overline{S1}$ of the segment signal is produced from the output terminal of the OR gate 102. The AND gate 100 is conductive when the key-in detection signal P is logic 0 to produce the signal $\overline{S1}$. In the step for detecting the close of the key switch, when the key-in detection signal P is logic 0, either of the MOSFETs 26 and 28 is conductive, and a signal corresponding to the decoder output signal S1 is derived from the key output terminal 24, as shown in FIG. 9G. When the key-in detection signal P is logic 1, the AND gate 44 is nonconductive and the P-channel MOSFET 30 is conductive. As a result, the key output signal is at E(V), as shown in FIG. 9G. The key-in detection pulse is derived from the key output terminal 24.

Since the signal Kin is logic 0, the N-channel MOSFET 48 is conductive, and the V1 voltage is applied to the backgate of the N-channel MOSFET 26, so that the backgate bias of the N-channel MOSFET 26 is 0(V), its ON-resistance is set at a small value, and the display section 14 is sufficiently driven.

Figure 1:
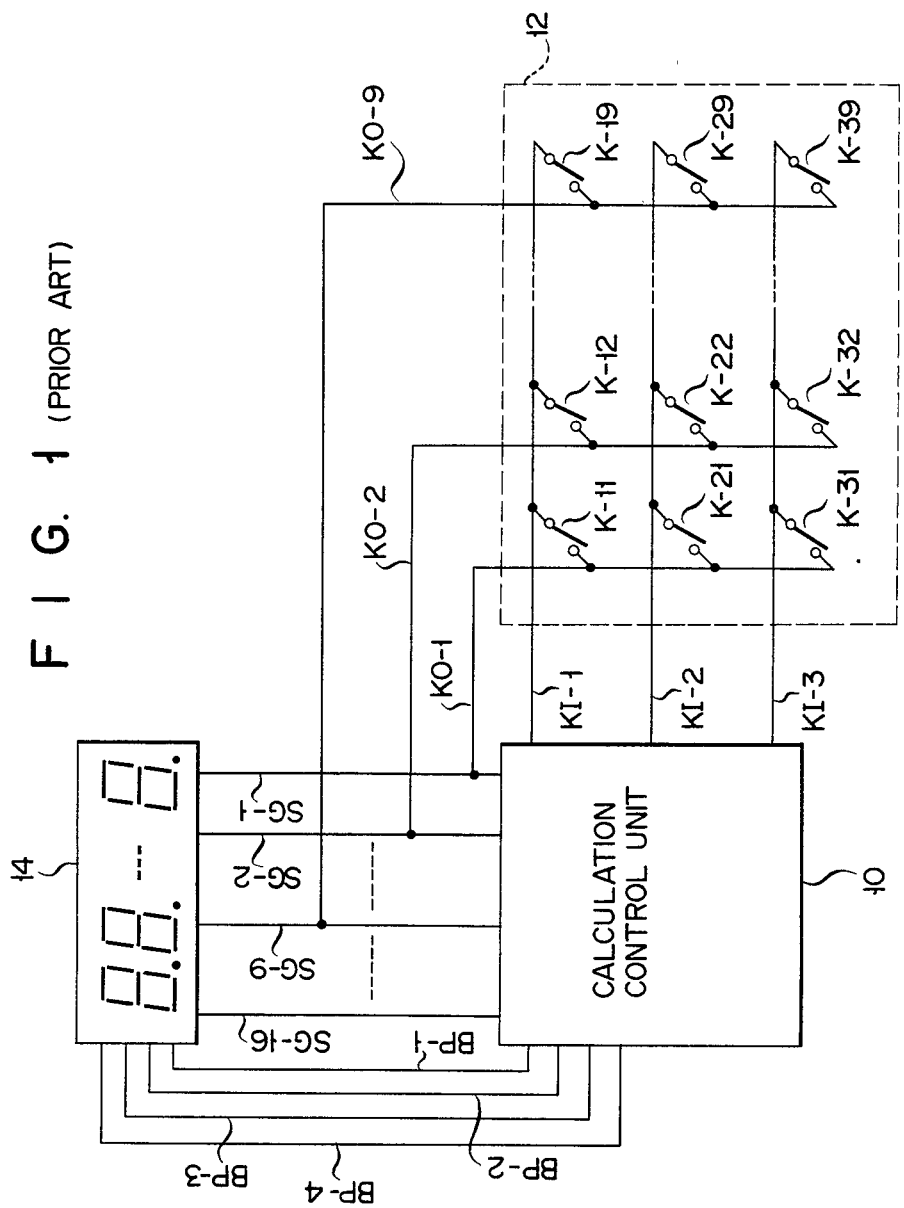
FIG. 1 is a circuit diagram of an electronic calculator of prior art.
Figure 2A:
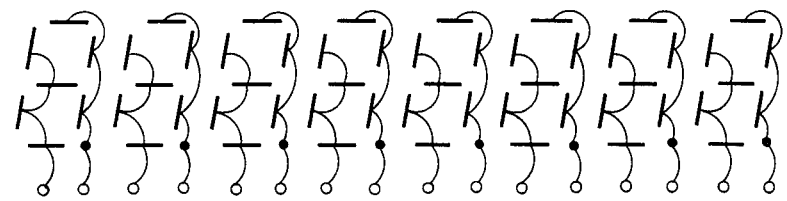
FIGS. 2A and 2B illustrate schematic diagrams of an arrangement of electrodes in a display section used in the calculator shown in FIG. 1.
Figure 2B:
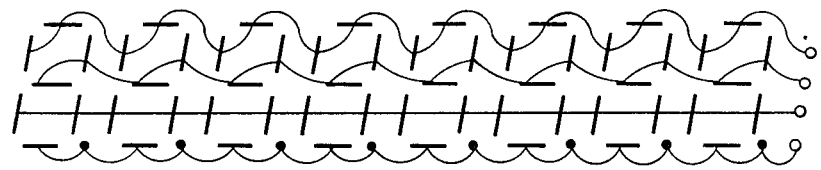
Figure 4:
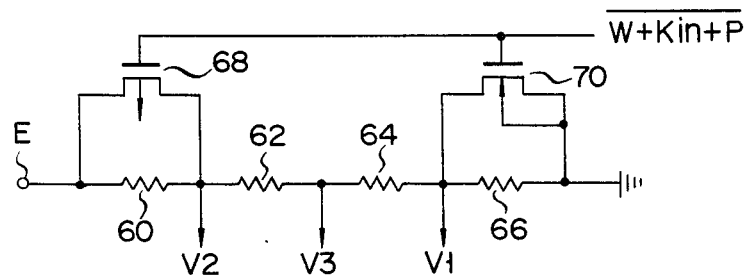
FIG. 4 is a circuit diagram of a voltage dividing circuit for forming voltage levels for driving the LCD.

Then, the key switch is closed, and when the close of the key switch is detected, the signal Kin become logic 1. As a result, the inverted signal $\overline{D1}$ of the key strobe signal is produced from the OR gate 38. The signals X and Y are still logic 0 and 1, respectively. The inverted signal $\overline{D1}$ appears at the output terminals of the OR gates 102 and 42. Since the signal Kin is logic 1, the signal P is always logic 0 and the output signal from the AND gate 100 is also the signal $\overline{D1}$. Accordingly, when the key strobe signal D1 is logic 1, the N-channel MOSFET 26 is nonconductive, while the P-channel MOSFETs 28 and 30 are conductive. The key output signal becomes E(V), as shown in FIG. 9G. Conversely, when the key strobe signal D1 is logic 0, the key output signal is V1(V). When the signal Kin is logic 1, the circuit shown in FIG. 4 provides V1=E/3(V). Since the signal Kin is logic 1, the backgate bias of the N-channel MOSFET 26 is V1=E/3(V), to have an increased ON-resistance. At this time, the display is extinguished. This indicates the reduction of current consumption. When the current consumption is negligible, the backgate of the N-channel MOSFET 26 may always be connected to the V1 voltage terminal.

Then, the registration or calculation is performed and the result of the operation is displayed. In the state of the key switch checking step 112 after one time processing of the keyed-in data in FIG. 5, the signals X and Y (FIGS. 9E and 9F) are pulse signals having the same periods, but different duty ratios. At this time, the signal Kin is logic 0. During one period of the signals X and Y, a duration T1 exists in which both the signals X and Y are logic 0, a duration T2 later occurs in which both the signals X and Y are logic 1, and a duration T3 follows that in which the signal X is logic 0 and the signal Y is logic 1.

In the interval of T1, the AND gate 100 is disabled by the signal Y, so that the N-channel MOSFET 26 is nonconductive irrespective of the signal S1. The P-channel MOSFET 28 is conductive or nonconductive in accordance with the output signal from the OR gate 102, i.e. the signal $\overline{S1}$. Accordingly, when the signal S1 is logic 1, the P-channel MOSFET 28 is conductive and the key signal output terminal 24 is set at V2 level. When the signal S1 is logic 0, the P-channel MOSFET 28 is nonconductive and the key signal output terminal 24 is in a high impedance state. Here, since the signal Kin is logic 0, V2=⅔E or E(V), and V2 is determined by the signal W.

In the interval of T2, the P-channel MOSFET 28 is made nonconductive by the signal X of logic 1 appears at the output terminal of the OR gate 102, irrespective of the signal S1. The AND gate 100 is conductive to derive the signal $\overline{S1}$ at the output terminal. Accordingly, when the signal S1 is logic 0, the N-channel MOSFET 26 is conductive and the key output terminal 24 is set at V1 level. When the signal S1 is logic 1, the N-channel MOSFET 26 is nonconductive and the key output terminal 24 is in a high impedance state.

In the interval of T3, like the step 102 for detecting the close of the key switch, the level at the key output terminal 24 is set at V2 since the P-channel MOSFETs 28 and 30 are conductive when the signal S1 is logic 1, and is set at V1 level since the N-channel MOSFET 26 is conductive when the signal S1 is logic 0. In the waveform of the key output signal shown in FIG. 9G, broken lines indicate the high impedance.

In the interval of T1 and T2, only the respective P-channel MOSFET 28 and N-channel MOSFET 26 are allowed to operate, and only those signals at levels V2 and V1 are allowed to be generated from the key signal output terminal 24. During T1, the display segments of the display section 14 are statically maintained at the V2 level, while the V1 level is dynamically maintained by the capacitance of the segments. During T2, the display segments in the display section 14 are statically maintained at the V1 level, while the V2 level is dynamically maintained by the capacitance of the segments. The display section 14 using the LCD equivalently operates as a capacitive element. If the level of the backplate signal changes during the time that the level of either of the level V1 or V2 is dynamically maintained, the level at the key output terminal 24 which is maintained dynamically by the capacitance of the segment changes with relation to the level of the backplate signal. Since the P-channel MOSFET 28 is nonconductive, the segments are kept at ⅔E(V) even if the V2 level changes from ⅔E to E(V) in the duration of T2 when the display segments are dynamically maintained at the V2 level.

The fact that the level does not change at the key output terminal 24 or that the level is changed at an undesired timing, adversely influences the display. To avoid such problem, an interval T3 is provided in which the signal level at the key output terminal 50 or the level of the backplate signal changes.

In the step 112, the signal Kin is logic 0, then the backgate bias of the N-channel MOSFET 26 is 0(V). The ON-resistance of the MOSFET 26 is set small.

Figure 7:
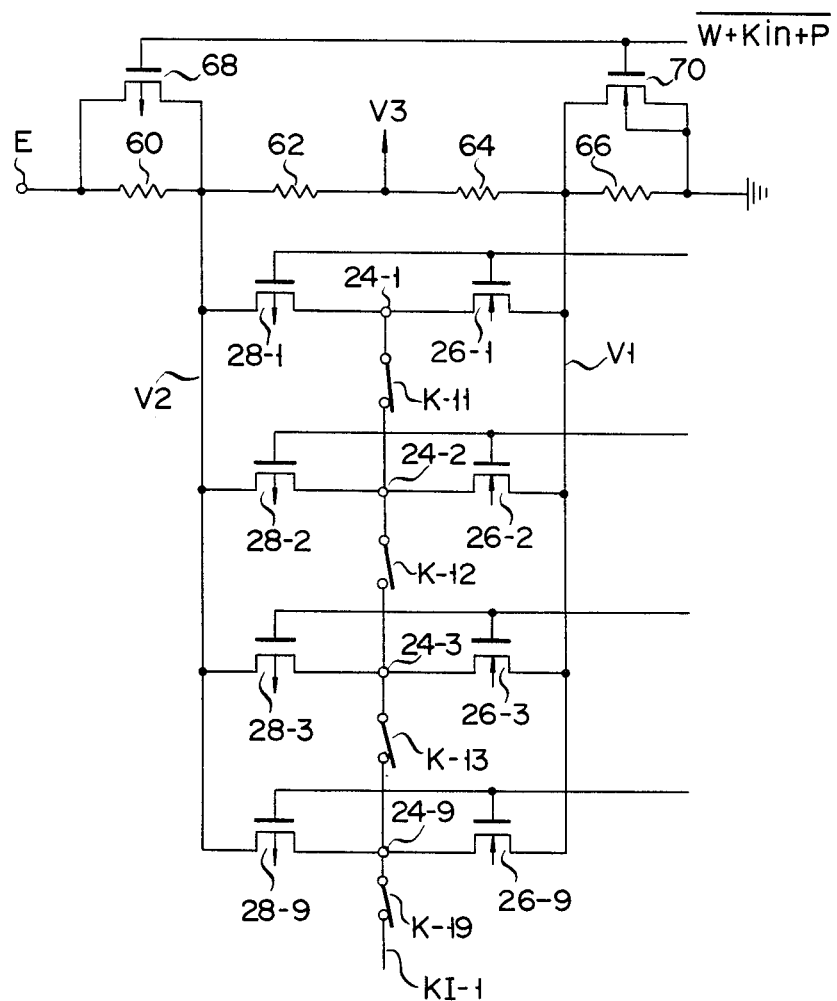
FIG. 7 is a circuit diagram for explaining the defect caused when a plurality of key switches are simultaneously depressed.

As described above, the period of the X and Y signals in the step 112 are divided into three durations T1 to T3. In the durations T1 and T2, only one of the MOSFETs 28 and 26 is conductive. Therefore, if the multi-close of the key switches takes place, the bypass circuit is not formed between the V1 and V2 voltage terminals, as shown in FIG. 7, in the voltage dividing circuit of the prior art. Accordingly, there is no need to increase the ON-resistance of the N-channel MOSFET 26 during the step 112. Accordingly, no variation takes place in the levels V1 and V2 for driving the display segments. Further, minor changes in the manufacturing parameters never cause erroneous display or imperfect display results. In the duration T3, like the prior art, both the MOSFETs 26 and 28 may be conductive, thereby to form a bypass. This duration, however, is much shorter than in the prior arrangement, so that this duration little influences the display adversely.

As described above, according to this embodiment, the common terminal for the key signal and the display signal is made to exhibit a high impedance during a part of the display period. As a result, even if the multi-close of the key switches takes place, no bypass is formed between the display drive voltage terminals to always obtain the predetermined display drive voltages V1 and V2. Therefore, even if the number of connection terminals is reduced, the display is little influenced by such reduction. Additionally, the condition for the parameters in manufacturing the LSI for the calculation control unit is not strict, so that the manufacturing cost of the LSI may be low.

It should be understood that the present invention is not limited to the above-mentioned embodiment. For example, the X and Y signals, which are supplied in common to all the key signal output circuits, may be provided individually for the output circuits. In this case, the signal X is applied to the output circuits at different timings. In a period, only one key output terminal is set at a certain level, while the other output terminals are set in a high impedance state. In this case, the key output terminals are in a high impedance state in a time-division manner.

What we claim is:
1. An electronic calculator comprising:
display means including voltage-controlled capacitive display elements for a plurality of digits;
key-in means including a plurality of key switches connected in matrix fashion to a plurality of column lines and row lines;
calculation control means having a set of output terminals connected both to said display means and said key-in means, said calculation control means including means for supplying detection signals to said key-in means for determining the closure state of said key switches and for supplying segment signals for operating said display means, the output terminals of said set operating simultaneously during a display period to supply said detection and segment signals; and said calculation control means including a voltage dividing circuit producing a plurality of voltage levels at a plurality of voltage supply points, a plurality of switching means for coupling said voltage levels to said output terminals to supply said detection and segment signals, and means for controlling said switching means to prevent said set of output terminals from being coupled through said switching means to more than one of said voltage supply points for any substantial length of time during said display period.

2. An electronic calculator according to claim 1, in which each of said key switches is connected at one end to a column line, and at the other end to a row line, and wherein said detection signal produced from said calculation control means is supplied through the column line to a closed key switch and back to said calculation control means through a row line, said calculation control means operating to transfer first and second voltages obtained from said voltage dividing circuit through first and second of said switching means to a selected one of said output terminals, said first and second switching means being made nonconductive during a substantial portion of said display period to prevent simultaneous application of said first and second voltages to said output terminal, thereby placing said output terminal in a high impedance state.

3. An electronic calculator according to claim 2, in which said detection signal continues to be transmitted through said key-in means during said display period.

4. In a calculating system having a matrix of key switches for generating inputs and voltage-controlled capacitive-type display means for displaying outputs, the combination comprising:

a plurality of control circuits for generating key input signals and display signals at predetermined voltage levels at a set of output terminals connected both to said key switches and said display means, said key input signals determining the state of said key switches and said display signals controlling the outputs displayed by said display means;

voltage divider means connected at a plurality of voltage supply points to said plurality of control circuits;

a pair of switching transistors in each of said control circuits, each said pair of switching transistors coupling a different one of said output terminals to said voltage supply points; and switching control means associated with said switching transistors for turning said transistors on and off in timed relation to apply said key input signals and said display signals to the respective ones of said output terminals simultaneously during a display period, said switching control means including timing means for preventing any of said pairs of switching transistors from being turned on simultaneously for any substantial length of time during said display period, whereby closure of said key switches is prevented from setting up current shunt paths between said voltage supply points which can materially affect the voltage levels at said points.

* * * * *